United States Patent
Takeuchi

(10) Patent No.: US 10,935,950 B2
(45) Date of Patent: Mar. 2, 2021

(54) PROGRAMMING SUPPORTING APPARATUS, PROGRAMMING SUPPORTING METHOD, AND RECORDING MEDIUM

(71) Applicant: Mitsubishi Electric Corporation, Tokyo (JP)

(72) Inventor: Shunsaku Takeuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 152 days.

(21) Appl. No.: 16/344,368

(22) PCT Filed: Mar. 28, 2018

(86) PCT No.: PCT/JP2018/012940
§ 371 (c)(1),
(2) Date: Apr. 24, 2019

(87) PCT Pub. No.: WO2019/186820
PCT Pub. Date: Oct. 3, 2019

(65) Prior Publication Data
US 2021/0003985 A1 Jan. 7, 2021

(51) Int. Cl.
*G05B 19/042* (2006.01)
*G06F 8/34* (2018.01)
(Continued)

(52) U.S. Cl.
CPC ......... *G05B 19/0426* (2013.01); *G05B 19/05* (2013.01); *G05B 19/056* (2013.01);
(Continued)

(58) Field of Classification Search
None
See application file for complete search history.

(56) References Cited

U.S. PATENT DOCUMENTS

2005/0228517 A1 10/2005 Tomita
2012/0265330 A1 10/2012 Beck et al.
(Continued)

FOREIGN PATENT DOCUMENTS

CN 102854842 A 1/2013
CN 106774171 A 5/2017
(Continued)

OTHER PUBLICATIONS

Office Action dated Mar. 5, 2020 in German Patent Application No. 11 2018 000 182.2, 8 pages.
(Continued)

*Primary Examiner* — Qing Yuan Wu
(74) *Attorney, Agent, or Firm* — Xsensus LLP

(57) ABSTRACT

A programming supporting apparatus that supports production of a control program for controlling a system configured from a plurality of mechanism components includes: a component-information storage unit to store component information corresponding to each of the mechanism components capable of configuring the system, the component information including a parameter for setting a condition of an operation executable by the system and a method describing, in accordance with the parameter, movement of a driving end that a driving device connected to the mechanism component is instructed to perform so as to cause the system to perform the operation; and a control-program producing unit to, when the mechanism component configuring the system is specified and the parameter for the mechanism component is set, produce the control program by using the method of the specified mechanism component and the set parameter.

11 Claims, 5 Drawing Sheets

(51) Int. Cl.
  *G05B 19/4093* (2006.01)
  *G05B 19/05* (2006.01)
  *G05B 19/4155* (2006.01)
  *G05B 19/418* (2006.01)

(52) U.S. Cl.
  CPC ..... *G05B 19/4093* (2013.01); *G05B 19/4155* (2013.01); *G06F 8/34* (2013.01); *G05B 19/41835* (2013.01); *G05B 2219/13* (2013.01); *G05B 2219/13004* (2013.01); *G05B 2219/13146* (2013.01); *G05B 2219/23008* (2013.01); *G05B 2219/23258* (2013.01)

(56) References Cited

U.S. PATENT DOCUMENTS

| | | | |
|---|---|---|---|
| 2013/0006396 | A1 | 1/2013 | Kito et al. |
| 2016/0196113 | A1* | 7/2016 | Osakabe ................ G05B 19/05 717/107 |

FOREIGN PATENT DOCUMENTS

| | | |
|---|---|---|
| JP | 2004-199524 A | 7/2004 |
| JP | 2005-327263 A | 11/2005 |
| JP | 2012-528366 A | 11/2012 |
| JP | 2017-079007 A | 4/2017 |
| TW | 201324350 A | 6/2013 |
| TW | I528122 B | 4/2016 |

OTHER PUBLICATIONS

Office Action dated Apr. 14, 2020 in Chinese Patent Application No. 201880005291.X, 13 pages.
International Search Report and Written Opinion dated Jun. 19, 2018 for PCT/JP2018/012940 filed on Mar. 28, 2018, 6 page in Japanese language only.
Decision to Grant a Patent received for Japanese Patent Application No. 2018-544372, dated Nov. 13, 2018, 4 pages including English Translation.
Office Action dated Jun. 23, 2020 in German Patent Application No. 11 2018 000 182.2, 7 pages.
Office Action issued in Taiwanese Application 108109439 dated Jul. 9, 2019.
Office Action dated Nov. 3, 2020 in Chinese Patent Application No. 201880005291.X, 12 pages.

* cited by examiner

PROGRAMMING SUPPORTING APPARATUS, PROGRAMMING SUPPORTING METHOD, AND RECORDING MEDIUM

CROSS-REFERENCE TO RELATED APPLICATION

The present application is based on PCT filing PCT/JP2018/012940 filed Mar. 28, 2018, the entire contents of which are incorporated herein by reference.

FIELD

The present invention relates to a programming supporting apparatus, a programming supporting method, and a recording medium that support production of a control program for controlling an operation of a system configured from a plurality of mechanism components.

BACKGROUND

Operations of a system configured from a plurality of mechanism components can be controlled by combining a plurality of control programs for controlling a driving device such as a motor connected to the mechanism components.

Patent Literature 1 discloses a programming supporting apparatus that supports production of a control program for a system configured from virtual mechanism components. With this programming supporting apparatus, a user has to program movement of a driving end that is an output end of a driving device such as a motor connected to the mechanism components.

CITATION LIST

Patent Literature

Patent Literature 1: Japanese Patent Application Laid-open No. 2017-79007

SUMMARY

Technical Problem

However, it is difficult to intuitively recognize the movement of a driving end, and production of a control program requires time and effort. For example, to move a sheet at a constant rate in a converting device configured from a plurality of mechanism components, the rotation speed of a driving device connected to an unwinding mechanism component that unwinds the sheet is not constant. The length of the sheet unwound in one revolution of the driving device varies depending on the current radius from the rotation axis of the unwinding mechanism component to the surface of the sheet. Thus, when the programming supporting apparatus disclosed in Patent Literature 1 is used, a control program needs to be produced by back calculating the movements of the driving end from the speed of movement of the sheet while taking into consideration the inner diameter of the unwinding mechanism component, the sheet thickness, and the like.

The present invention has been achieved in view of the above problems, and an object of the present invention is to provide a programming supporting apparatus and a programming supporting method that enable easy production of a control program.

Solution to Problem

In order to solve the above problems and achieve the object, an aspect of the present invention is a programming supporting apparatus that supports production of a control program for controlling a system configured from a plurality of mechanism components. The programming supporting apparatus includes: a component-information storage unit to store component information corresponding to each of the mechanism components capable of configuring the system; and a control-program producing unit to, when the mechanism component configuring the system is specified and a parameter for the mechanism component is set, produce the control program by using a method included in the component information on the mechanism component and the set parameter. The component information includes a parameter for setting a condition of an operation executable by the system and a method that is a program component describing, in accordance with the parameter, movement of a driving end that a driving device connected to the mechanism component is instructed to perform so as to cause the system to perform the operation.

Advantageous Effects of Invention

The programming supporting apparatus according to the present invention has an effect where it is possible to easily produce a control program.

DESCRIPTION OF EMBODIMENTS

A programming supporting apparatus, a programming supporting method, and a recording medium according to embodiments of the present invention will be described in detail below with reference to the accompanying drawings. The present invention is not limited to the embodiments.

Embodiment

Figure 1:
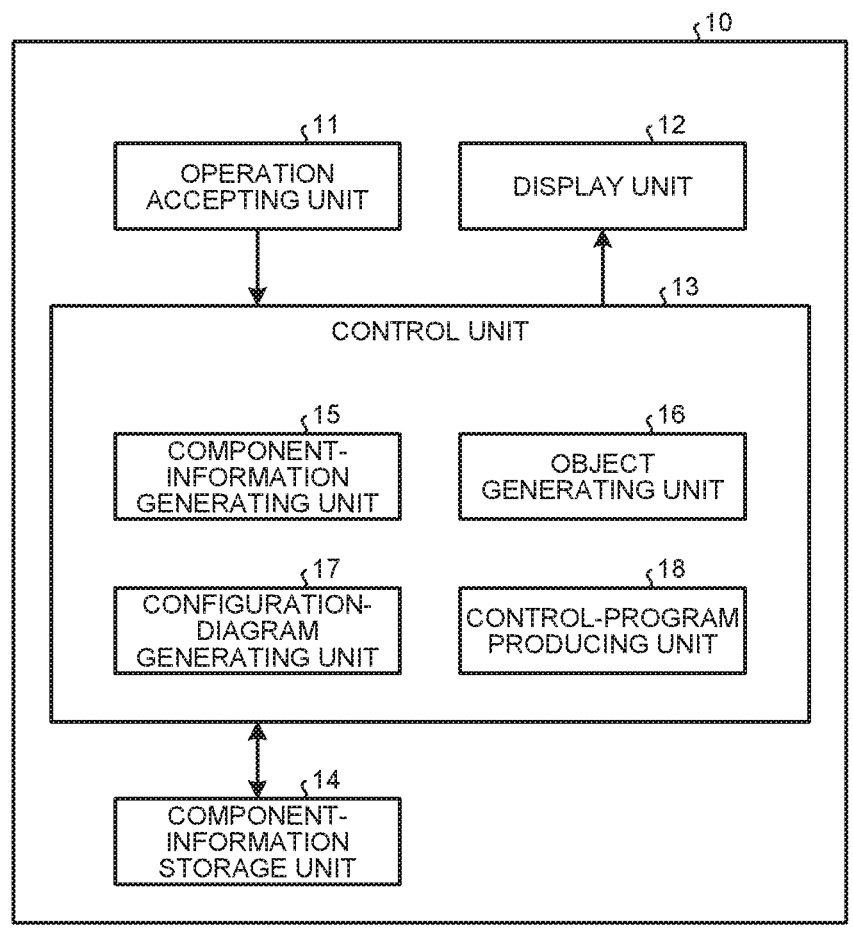
FIG. 1 is a diagram illustrating a configuration of a programming supporting apparatus according to an embodiment of the present invention.

FIG. 1 is a diagram illustrating a configuration of a programming supporting apparatus 10 according to an embodiment of the present invention. The programming supporting apparatus 10 supports production of a control program that controls a system configured from a plurality of mechanism components. A driving device such as a motor is connected to each of the mechanism components. The mechanism component is a component that physically moves in conjunction with the driving device such as a motor. Examples of the mechanism components include transmission components, link-mechanism components, liner-motion components, and rotation components. By driving the motors, the mechanism components operate in conjunction with the motors; therefore, the system can perform a desired operation. Thus, the control program is configured from commands to be input to the motors. In the following descriptions, the present embodiment is described by referring to a converting device configured from mechanism components, such as an unwinding mechanism component and a winding component, by way of example.

The programming supporting apparatus 10 includes an operation accepting unit 11, a display unit 12, a control unit 13, and a component-information storage unit 14. The control unit 13 includes a component-information generating unit 15, an object generating unit 16, a configuration-diagram generating unit 17, and a control-program producing unit 18.

The operation accepting unit 11 accepts various operations from a user. The operation accepting unit 11 is an interface that accepts an operation signal from an input device, for example, a pointing device such as a mouse or a touch sensor, and a keyboard, or an input device provided in the programming supporting apparatus 10. The display unit 12 is a display device such as a liquid crystal display device or an organic electro luminescence (EL) display device.

Figure 2:
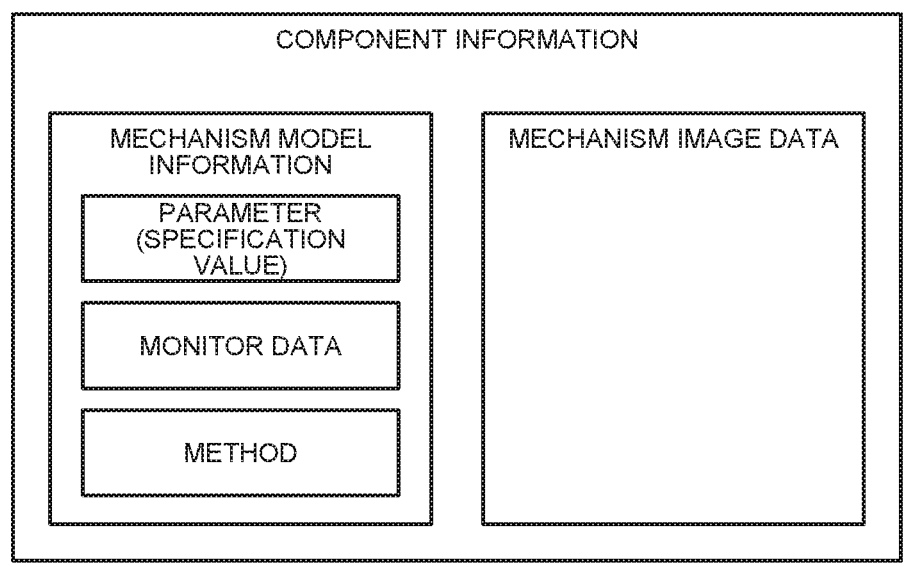
FIG. 2 is a diagram illustrating a configuration of component information stored in a component-information storage unit illustrated in FIG. 1.

The component-information storage unit 14 stores component information corresponding to each of a plurality of mechanism components that can configure a system. FIG. 2 is a diagram illustrating a configuration of component information stored in the component-information storage unit 14 illustrated in FIG. 1. Component information includes mechanism model information and mechanism image data. The mechanism model information includes parameters for setting an operation condition of a system, where the parameters include specification values, monitor data for monitoring movement of the system that uses a corresponding mechanism component, and a method that is program data for causing the system to perform a predetermined operation by using the corresponding mechanism component.

When the mechanism component is an unwinding mechanism component, the parameters are the inner diameter, the sheet thickness, and the like, and the monitor data is the current unwinding rate, the unwound length, and the like. The method is a program component in accordance with the parameters and defines movement of a machine end. The movement of the machine end refers to movement of a load controlled by the system, and it is movement of a sheet in the example with the converting device. The method converts the movement of the machine end to movement of a driving end that is movement a driving device connected to the mechanism component is instructed to perform. The driving end is an output end of the driving device, and it is an end the movement of which is directly controlled by the driving device. The program component is a componentized program that is prepared in advance for each function. A process for achieving that function is performed by invoking the program component from outside and launching it. A plurality of methods can be defined for one mechanism component. In a case of an unwinding mechanism component, methods such as a constant-rate running, stopping, and manual running, can be defined. Mechanism image data is image data that reproduces a corresponding mechanism component, and is illustration image data illustrating the mechanism component, exterior photo data on the mechanism component, or the like.

Figure 3:
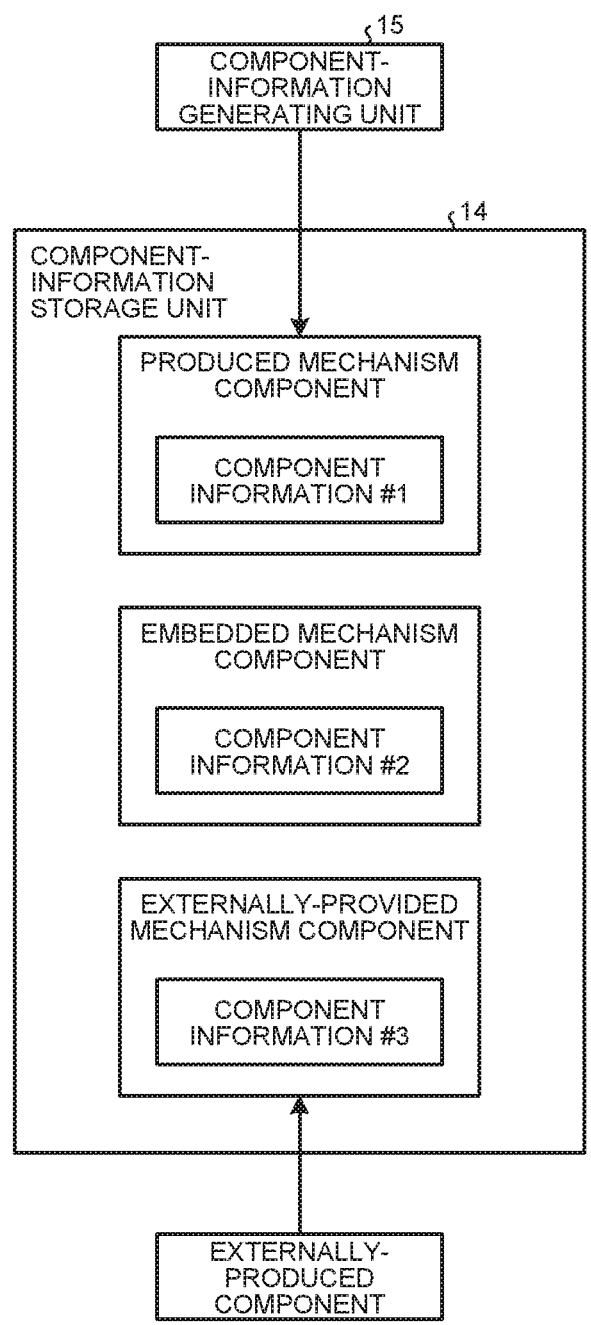
FIG. 3 is a diagram illustrating the types of component information stored in the component-information storage unit illustrated in FIG. 1.

FIG. 3 is a diagram illustrating the types of component information stored in the component-information storage unit 14 illustrated in FIG. 1. The component-information storage unit 14 illustrated in FIG. 3 stores component information #1 on a produced mechanism component that is component information generated by the component-information generating unit 15, component information #2 on an embedded mechanism component that is component information prepared in advance, and component information #3 on an externally-provided mechanism component obtained by reading an externally-produced component.

In this way, by enabling use of the component information #1 on the produced mechanism component that is newly produced by a user, it is possible to produce a control program by using functions of the programming supporting apparatus 10 even when a mechanism component not prepared in advance is used. Further, for a mechanism component that is frequently used, the component information #2 on an embedded mechanism component is prepared in advance. Thus, it is possible to produce a control program by using the prepared component information #2 without generation of component information by the user. Furthermore, by enabling reading and use of the component information #3 on an externally-provided mechanism component, even for a mechanism component for which the component information #2 is not prepared as an embedded mechanism component, it is possible to produce a control program by using the functions of the programming supporting apparatus 10 by using the component information #3 generated later, without generation of component information by the user. The component information #3 on the externally-provided mechanism component may be component information produced by another user who uses the programming supporting apparatus 10 or component information provided by a manufacturer that provides that mechanical component, for example.

The description here refers back to FIG. 1. The control unit 13 controls an operation of the programming supporting apparatus 10. The component-information generating unit 15 can generate component information on the basis of an operation signal input via the operation accepting unit 11. A user inputs the type of a parameter settable for a mechanism component, monitor data, a method, and mechanism image data into a component-information generating screen (not illustrated) by using an input device provided in or connected to the operation accepting unit 11. The component-information generating unit 15 generates component information on the basis of the input information and stores the component information in the component-information storage unit 14.

The object generating unit 16 generates a mechanism object of the mechanism component on the basis of the component information stored in the component-information storage unit 14. A mechanism object is an instantiation of mechanism model information included in corresponding component information. Mechanism model information corresponds to a template defined for each object type and is also called "class" in object-oriented modeling. A mechanism object is data produced on the basis of mechanism model information and is also called "instance" in object-oriented modeling. Instantiation can be achieved by declaring a mechanism object. By instantiating mechanism model information to generate a mechanism object, it is possible to set a parameter for each mechanism object and invoke a method defined in the mechanism model information. An operation for declaring a mechanism object is not limited as long as it is an operation to identify component information as a target.

Figure 4:
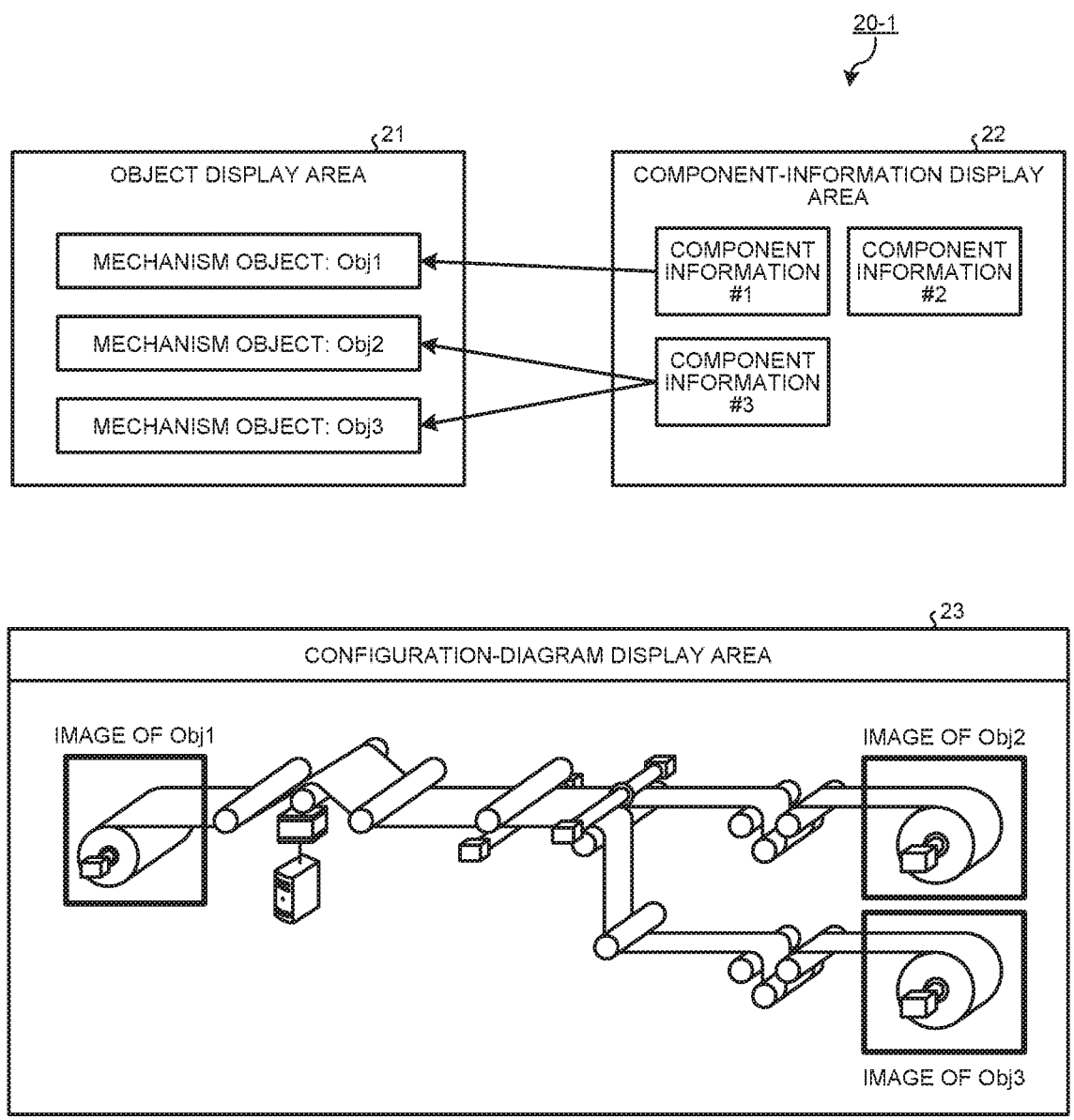
FIG. 4 is an explanatory diagram of a method of declaring a mechanism object by an object generating unit illustrated in FIG. 1.

FIG. 4 is an explanatory diagram of a method of declaring a mechanism object by the object generating unit 16 illustrated in FIG. 1. FIG. 4 illustrates a display screen 20 displayed on the display unit 12. In the following descriptions, specific states of the display screen 20 are distinguished from each other by a reference sign followed by a hyphen and then a number. A display screen 20-1 illustrated in FIG. 4 includes an object display area 21, a component-information display area 22, and a configuration-diagram display area 23. For example, when a user selects one of a plurality of pieces of component information displayed in the component-information display area 22 by using an input device, the object generating unit 16 generates a mechanism object based on the selected component information. The generated mechanism object is displayed in the object display area 21. Alternatively, when the user selects one of a plurality of pieces of component information displayed in the component-information display area 22 and drags and drops it into the object display area 21, the object generating unit 16 generates a mechanism object based on the selected component information.

The configuration-diagram generating unit 17 generates a configuration diagram of a system configured from a plurality of mechanism components by using component information. A configuration diagram corresponds to mechanism images, which are respectively obtained by reproducing mechanism components, arranged in accordance with the arrangement of the mechanism components in an actual system. Specifically, when a user selects a mechanism object displayed in the object display area 21 illustrated in FIG. 4 and drags and drops it into the configuration-diagram display area 23, the configuration-diagram generating unit 17 displays a mechanism image of the selected mechanism object in the configuration-diagram display area 23. A configuration diagram is generated by combining a plurality of mechanism images. The configuration-diagram generating unit 17 can also capture image data on the generated configuration diagram and store it in a storage unit.

Alternatively, when the user selects component information displayed in the component-information display area 22 and drags and drops it into the configuration-diagram display area 23 on the display screen 20-1 illustrated in FIG. 4, the configuration-diagram generating unit 17 can also display a mechanism image included in the selected component information in the configuration-diagram display area 23. When a drag-and-drop operation from the component-information display area 22 to the configuration-diagram display area 23 is performed, the object generating unit 16 generates a mechanism object in response to this drag-and-drop operation. In this case, an operation of arranging the mechanism object displayed in the object display area 21 in the configuration-diagram display area 23 is omitted.

Figure 5:
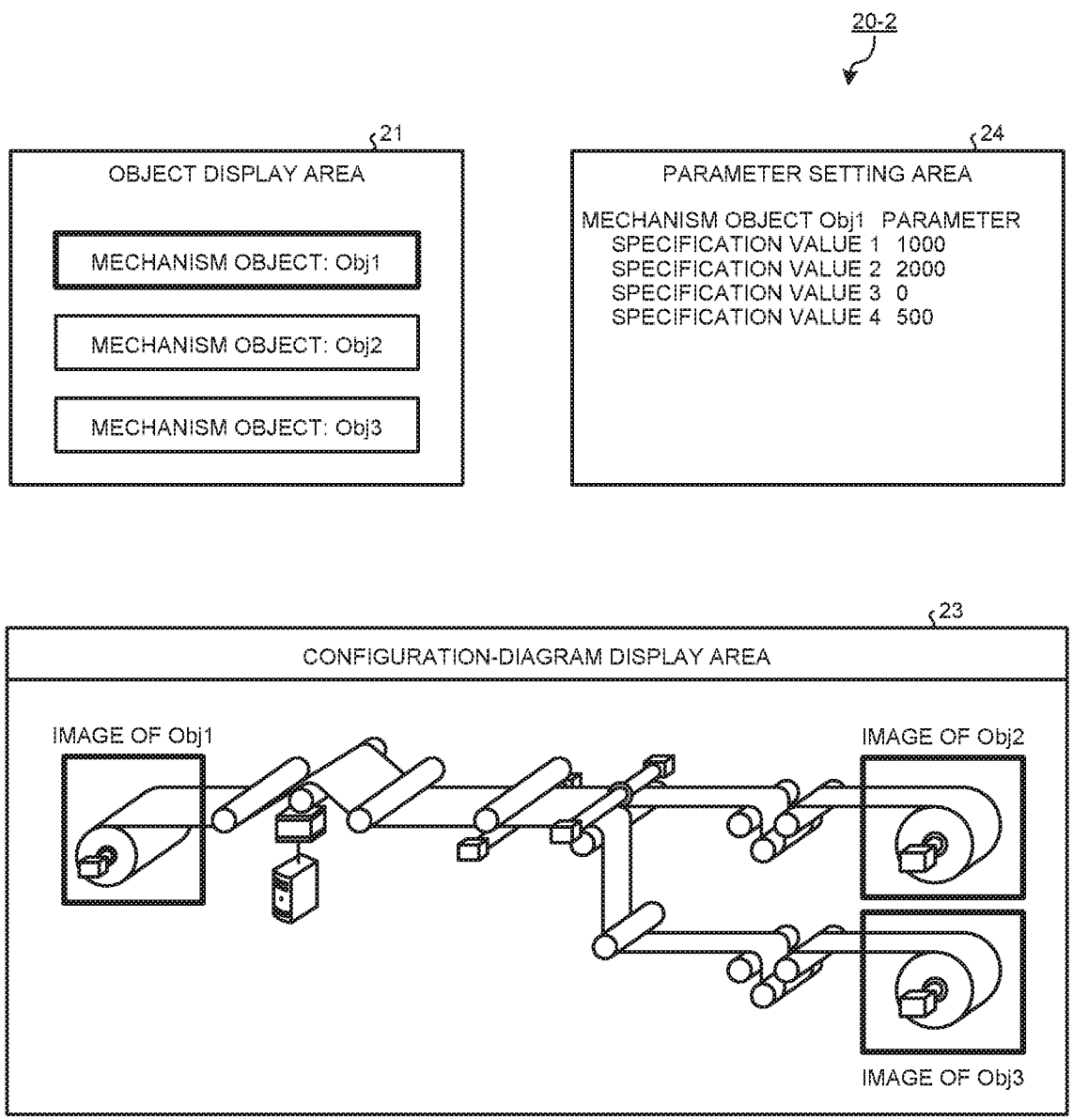
FIG. 5 is an explanatory diagram of a method of setting a parameter by the object generating unit illustrated in FIG. 1.

FIG. 5 is an explanatory diagram of a method of setting a parameter by the object generating unit 16 illustrated in FIG. 1. A display screen 20-2 illustrated in FIG. 5 includes the object display area 21, the configuration-diagram display area 23, and a parameter setting area 24. When an operation of selecting one of a plurality of mechanism objects displayed in the object display area 21 is detected, the object generating unit 16 displays the type of a parameter settable for the selected mechanism object and an input area for each parameter in the parameter setting area 24 by using component information on the selected mechanism object. A user can set a parameter that is an operation condition of a system by inputting a value of the parameter to the displayed input area. When an operation of selecting, in place of a mechanism object displayed in the object display area 21, mechanism image displayed in the configuration-diagram display area 23 is detected, the object generating unit 16 can also display the type of a parameter settable for a mechanism object corresponding to the selected mechanism image and an input area for each parameter in the parameter setting area 24.

Figure 6:
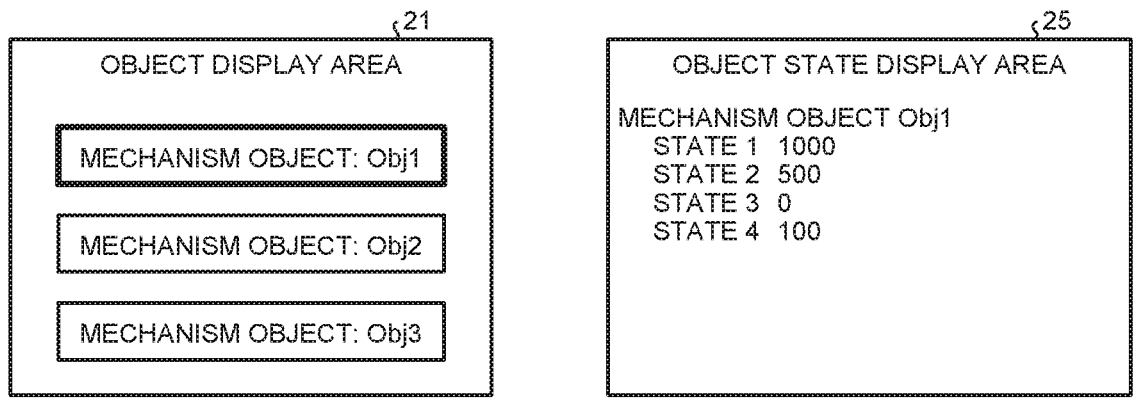
FIG. 6 is an explanatory diagram of a method of displaying, by the object generating unit illustrated in FIG. 1, a state of each mechanism component in a system to be controlled by a control program produced by the programming supporting apparatus.
Figure 6:
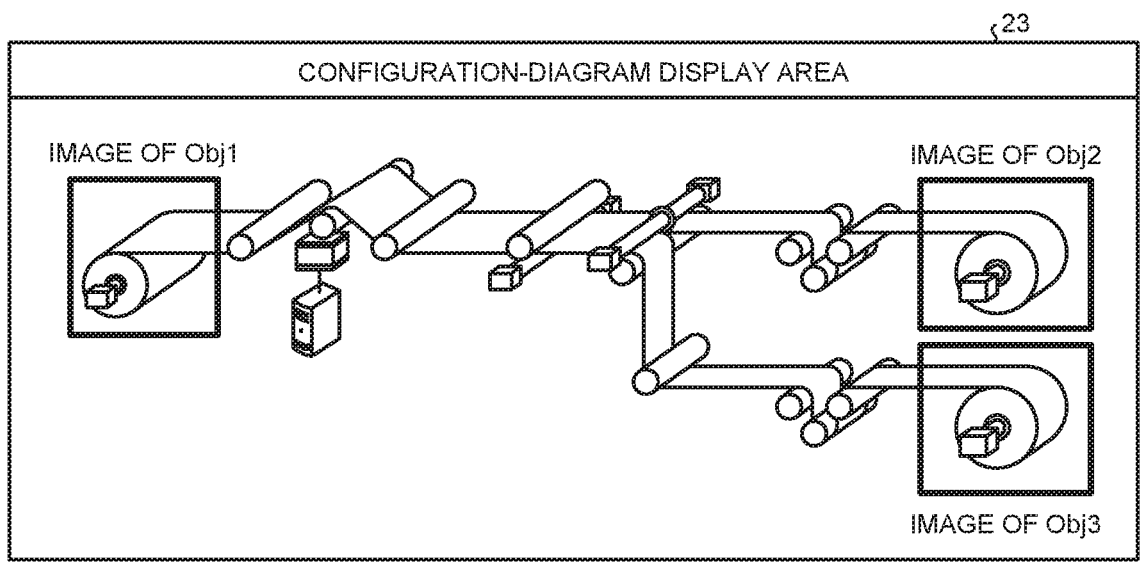

FIG. 6 is an explanatory diagram of a method of displaying, by the object generating unit 16 illustrated in FIG. 1, a state of each mechanism component in a system to be controlled by a control program produced by the programming supporting apparatus 10. The object generating unit 16 displays, in an object-state display area 25, the state of each mechanism component in a case where the system operates under a condition defined by a parameter set for each mechanism object. A display screen 20-3 illustrated in FIG. 6 displays a state in which a mechanism object Obj1 is selected in the object display area 21, and it also displays a state of a mechanism component represented by the mechanism object Obj1 in the object-state display area 25. The state of the mechanism component is obtained by using monitor data included in corresponding component information. When an operation of selecting, in place of a mechanism object displayed in the object display area 21, a mechanism image displayed in the configuration-diagram display area 23 is detected, the object generating unit 16 can also display a state of a mechanism component corresponding to the selected mechanism image in the object-state display area 25.

When a mechanism component configuring a system is specified, a parameter for that mechanism component is set, and an operation is performed to produce a program by the user specifying a method corresponding to a function that needs to be performed, the control-program producing unit 18 uses the specified method to produce a control program. The control-program producing unit 18 produces a control program by using a mechanism object included in the generated configuration diagram, a parameter set for that mechanism object, and a method included in component information on that mechanism object.

For example, "Obj1" is obtained by objectifying an unwinding mechanism component of a converting device and includes an "automatic unwinding" method that unwinds a sheet in accordance with the line speed and a "stopping" method that stops the converting device. "Obj2" and "Obj3" are obtained by objectifying a winding mechanism component and include a "winding" method that winds the sheet to achieve a target tension and a "stopping" method that stops the converting device. By using these methods, a user can describe a program for causing the converting device to operate automatically in the following manner.

Obj1. automatic unwinding (line speed)
Obj2. winding (target tension)
Obj3. winding (target tension)

Also, by combining the "stopping" methods of "Obj1", "Obj2", and "Obj3", the user can describe a program for stopping the converting device in the following manner.

Obj1. stopping( )
Obj2. stopping( )
Obj3. stopping( )

Figure 7:
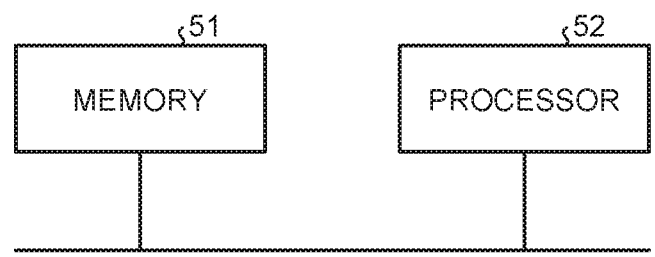
FIG. 7 is a diagram illustrating a hardware configuration for achieving functions of the programming supporting apparatus illustrated in FIG. 1.

FIG. 7 is a diagram illustrating a hardware configuration for achieving functions of the programming supporting apparatus 10 illustrated in FIG. 1. The functions of the programming supporting apparatus 10 can be achieved by using a memory 51 included in an information processing apparatus such as a personal computer (PC), and a processor 52.

The memory 51 is a nonvolatile or volatile semiconductor memory, such as a random access memory (RAM), a read only memory (ROM), a flash memory, an erasable programmable ROM (EPROM), or an electrically EPROM (EEPROM) (registered trademark), a magnetic disk, a flexible disk, an optical disk, a compact disk, a mini disk, a digital versatile disk (DVD), or the like.

The processor 52 is a central processing unit (CPU) and is also called a central processing device, a processing device, an arithmetic device, a microprocessor, a microcomputer, a digital signal processor (DSP), or the like. The processor 52 can achieve respective functions of the programming supporting apparatus 10 by reading a computer program stored in the memory 51 and executing the program.

As described above, according to the embodiment of the present invention, by specifying a mechanism component configuring a system and by setting a parameter for the mechanism component, a user can produce a control program for the system configured from the specified mechanism component by using a method that is a program component included in component information. The method is a program component in accordance with the parameter and is defined for each function of a mechanism component in advance. Further, the method includes a command describing movement of a driving end that a driving device connected the mechanism component is instructed to perform so as to cause the system configured from that mechanism component to perform a predetermined operation. In a case where the mechanism component is an unwinding roller and it configures a converting device, the parameter set for the mechanism component is, for example, an operation condition of the system such as the inner diameter of an unwinding roller and the film thickness. In this manner, it is sufficient if a user specifies the function of the mechanism component without considering the movement of the driving end of the driving device connected to the mechanism component. Therefore, it is possible to easily produce a control program in an intuitive manner.

Further, the method is a computer program in accordance with a parameter and is defined for each function of a mechanism component in advance. Therefore, even when the specification of a mechanism component such as the inner diameter of an unwinding mechanism component is changed, it is only necessary to change the parameter and the program itself does not need to be changed. Accordingly, even when the specification of the mechanism component is changed, it is possible to flexibly deal with the change.

In addition, a mechanism component configuring a system can be specified by selecting the mechanism component and arranging it in the configuration-diagram display area 23, for example. With such a configuration, a control program can be produced in a more intuitive manner.

The configurations described in the embodiment are only examples of an aspect of the present invention. The configurations can be combined with other well-known techniques, and part thereof can be omitted or modified without departing from the scope of the invention.

An example of a converting device configured from mechanism components including an unwinding mechanism component, a winding mechanism component, and the like has been described in the embodiment described above. However, the present embodiment is not limited thereto. For example, the technique of the present invention can be applied to various devices such as a robot, a press, and a packing machine.

Furthermore, while functions of the programming supporting apparatus 10 have been described in the embodiment described above, the invention according to the present embodiment can be also achieved as a programming supporting method performed by the programming supporting apparatus 10 or as a computer program for causing a computer to perform respective steps of the programming supporting method.

REFERENCE SIGNS LIST 10 programming supporting apparatus, 11 operation accepting unit, 12 display unit, 13 control unit, 14 component-information storage unit, 15 component-information generating unit, 16 object generating unit, 17 configuration-diagram generating unit, 18 control-program producing unit, 20, 20-1, 20-2, 20-3 display screen, 21 object display area, 22 component-information display area, 23 configuration-diagram display area, 24 parameter setting area, 25 object-state display area, 51 memory, 52 processor.

The invention claimed is:

1. A programming supporting apparatus that supports production of a control program for controlling a system configured from a plurality of mechanism components, the programming supporting apparatus comprising:
   a component-information memory to store component information corresponding to each of the mechanism components capable of configuring the system, the component information including a parameter for setting a condition of an operation executable by the system and a method that is a program component describing, in accordance with the parameter, movement of a driving end that a driving device connected to the mechanism component is instructed to perform so as to cause the system to perform the operation; and
   control-program producing circuitry configured to, when the mechanism component configuring the system is specified and the parameter for the mechanism component is set, produce the control program by using the method of the specified mechanism component and the set parameter.

2. The programming supporting apparatus according to claim 1, further comprising:
   configuration-diagram generating circuitry configured to generate a configuration diagram in which the mechanism components configuring the system are arranged in accordance with a configuration of the system,
   wherein the control-program producing circuitry produces the control program by using the method of the mechanism component included in the configuration diagram.

3. The programming supporting apparatus according to claim 2, further comprising:
   operation accepting circuitry,
   wherein the configuration-diagram generating circuitry generates the configuration diagram by using the mechanism component specified via the operation accepting circuitry.

4. The programming supporting apparatus according to claim 2, wherein:

the component information includes mechanism image data on a mechanism image that is an image representing the mechanism component, and the configuration-diagram generating circuitry generates the configuration diagram in which the mechanism images are arranged.

5. The programming supporting apparatus according to claim 3, wherein:

the component information includes mechanism image data on a mechanism image that is an image representing the mechanism component, and the configuration-diagram generating circuitry generates the configuration diagram in which the mechanism images are arranged.

6. The programming supporting apparatus according to claim 1, further comprising:

object generating circuitry configured to generate, on a basis of the component information on the specified mechanism component, a mechanism object that is an instance of the component information, wherein the control-program producing circuitry produces the control program by using the component information on the generated mechanism object.

7. The programming supporting apparatus according to claim 6, further comprising:

operation accepting circuitry, wherein the object generating circuitry sets the parameter for the mechanism object on a basis of an operation signal input via the operation accepting circuitry.

8. The programming supporting apparatus according to claim 1, further comprising:

a display, wherein:

the component information further includes monitor data for simulating an operation of the mechanism component, and the display displays a state of the mechanism component at a plurality of time points by using the monitor data.

9. The programming supporting apparatus according to claim 1, further comprising:

operation accepting circuitry; and component-information generating circuitry configured to generate the component information on a basis of an operation signal input via the operation accepting circuitry.

10. A programming supporting method for supporting production of a control program for controlling a system configured from a plurality of mechanism components, the method, performed by a programming supporting apparatus to acquire component information corresponding to each of the mechanism components configuring the system, the component information including a parameter for setting a condition of an operation executable by the system and a method that is a program component describing, in accordance with the parameter, movement of a driving end that a driving device connected to the mechanism component is instructed to perform so as to cause the system to perform the operation, comprising:

accepting a specification of the mechanism component configuring the system;

accepting the parameter of the specified mechanism component; and producing the control program by using the method included in the component information on the specified mechanism component and the accepted parameter.

11. A non-transitory computer-readable recording medium that stores therein a program for causing a programming supporting apparatus to acquire component information corresponding to each of a plurality of mechanism components configuring a system and supports production of a control program for controlling the system, the component information including a parameter for setting a condition of an operation executable by the system and a method that is a program component describing, in accordance with the parameter, movement of a driving end that a driving device connected to the mechanism component is instructed to perform so as to cause the system to perform the operation, to execute:

accepting specification of the mechanism component configuring the system;

accepting the parameter of the specified mechanism component; and producing the control program by using the method included in the component information on the specified mechanism component and the accepted parameter.

* * * * *